US010558527B2

(12) United States Patent
Kazi et al.

(10) Patent No.: US 10,558,527 B2
(45) Date of Patent: Feb. 11, 2020

(54) REBUILDING STRATEGY IN MEMORY MANAGED MULTI-SITE DUPLICATION

(71) Applicant: International Business Machines Corporation, Armonk, NY (US)

(72) Inventors: Asimuddin Kazi, Naperville, IL (US); Jason K. Resch, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 167 days.

(21) Appl. No.: 15/839,254

(22) Filed: Dec. 12, 2017

(65) Prior Publication Data

US 2018/0101438 A1 Apr. 12, 2018

Related U.S. Application Data

(63) Continuation-in-part of application No. 15/642,875, filed on Jul. 6, 2017, now Pat. No. 10,120,739, which is a continuation-in-part of application No. 14/869,240, filed on Sep. 29, 2015, now Pat. No. 9,727,275.

(60) Provisional application No. 62/086,542, filed on Dec. 2, 2014.

(51) Int. Cl.
| *G06F 11/10* | (2006.01) |
| *G06F 11/00* | (2006.01) |
| *G06F 11/07* | (2006.01) |

(52) U.S. Cl.
CPC ...... *G06F 11/1092* (2013.01); *G06F 11/0709* (2013.01); *G06F 11/0751* (2013.01); *G06F 11/0793* (2013.01); *G06F 11/0796* (2013.01); *G06F 2211/1028* (2013.01)

(58) Field of Classification Search
None
See application file for complete search history.

(56) References Cited

U.S. PATENT DOCUMENTS

| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |

(Continued)

OTHER PUBLICATIONS

Chung; An Automatic Data Segmentation Method for 3D Measured Data Points; National Taiwan University; pp. 1-8; 1998.

(Continued)

*Primary Examiner* — Justin R Knapp
(74) *Attorney, Agent, or Firm* — Garlick & Markison; Timothy W. Markison; Patricia A. Markison

(57) ABSTRACT

A method includes identifying encoded data slices in need of rebuilding, where the encoded data slices are of plurality of copies of a set of encoded data slices stored in a plurality of sets of storage units of a plurality of dispersed storage network (DSN) memories. The method further includes determining a rebuilding strategy for the encoded data slices in need of rebuilding based on at least one of an urgency rebuild factor and a rebuild complexity factor. For a first encoded data slice of the encoded data slices in need of rebuilding, the method includes implementing a rebuild of the first encoded data slice in accordance with the rebuilding strategy to produce a rebuilt first encoded data slice, and sending the rebuilt first encoded data slice to a first storage unit of one of the plurality of sets of storage units.

18 Claims, 9 Drawing Sheets

(56) References Cited

U.S. PATENT DOCUMENTS

| | | | |
|---|---|---|---|
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,788,769 | B2 * | 7/2014 | Abercrombie ...... G06F 11/1461 711/162 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2014/0331086 | A1 * | 11/2014 | Resch ................ G06F 11/1458 714/15 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

* cited by examiner

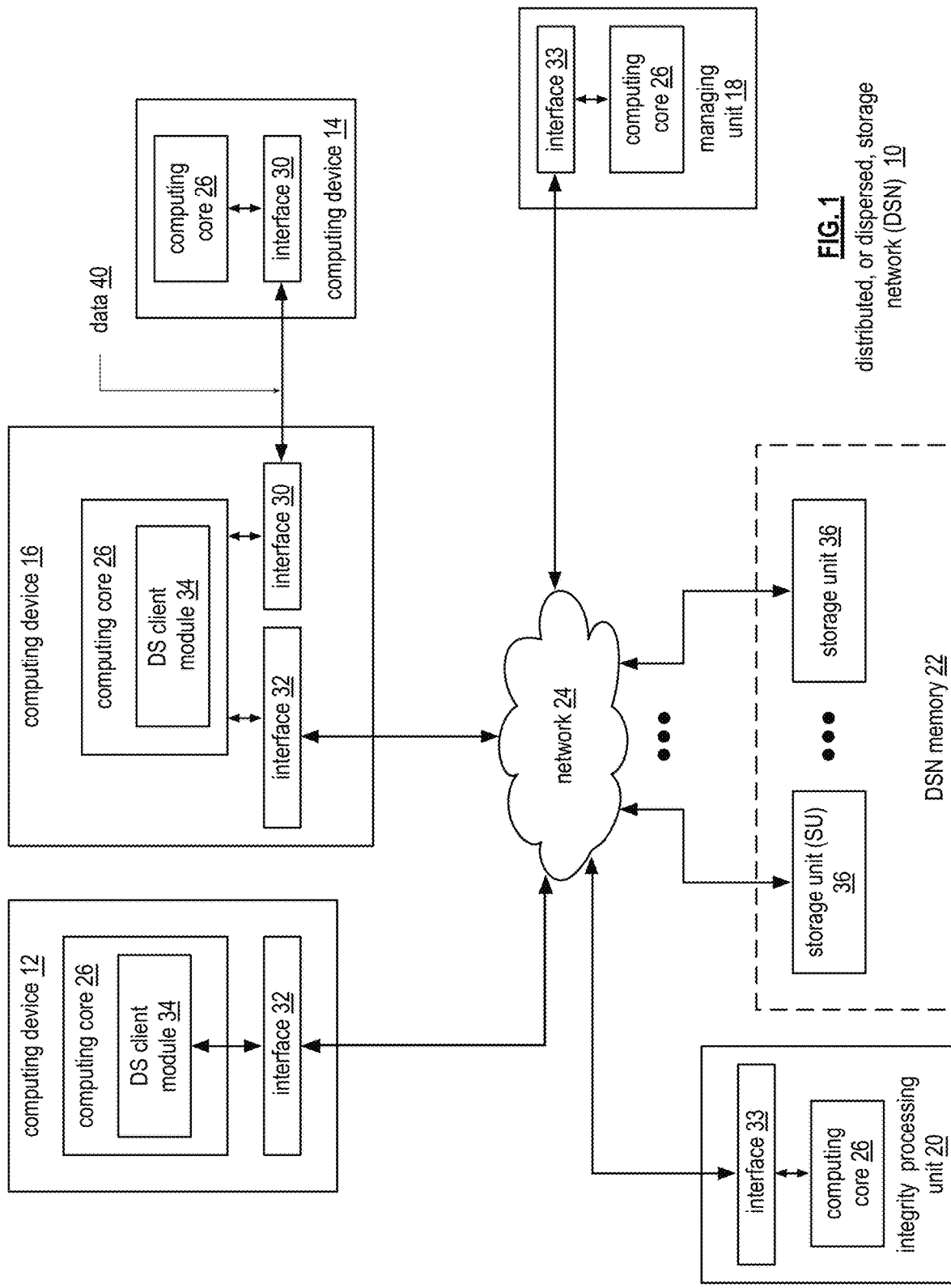

distributed, or dispersed, storage network (DSN) 10

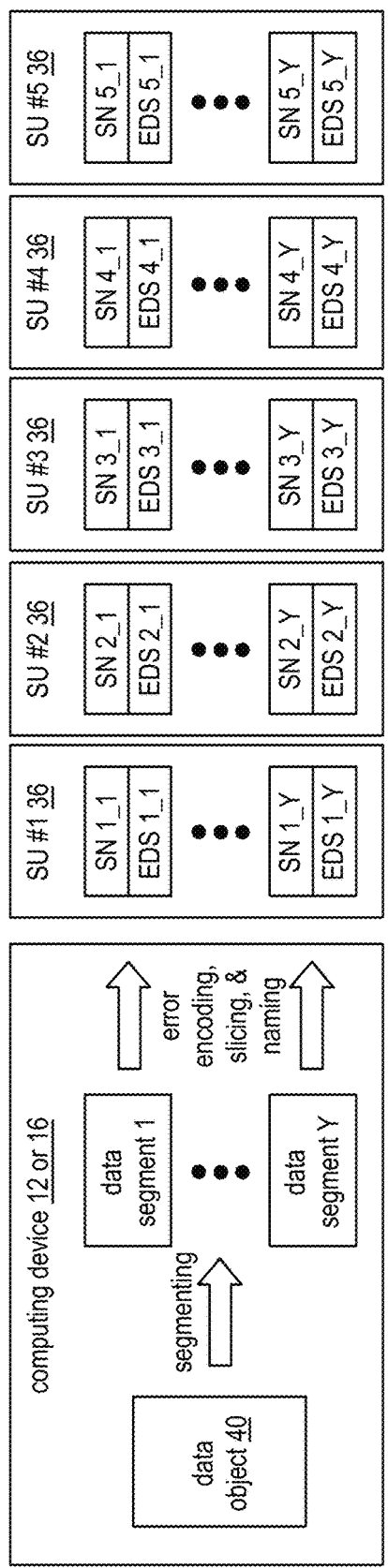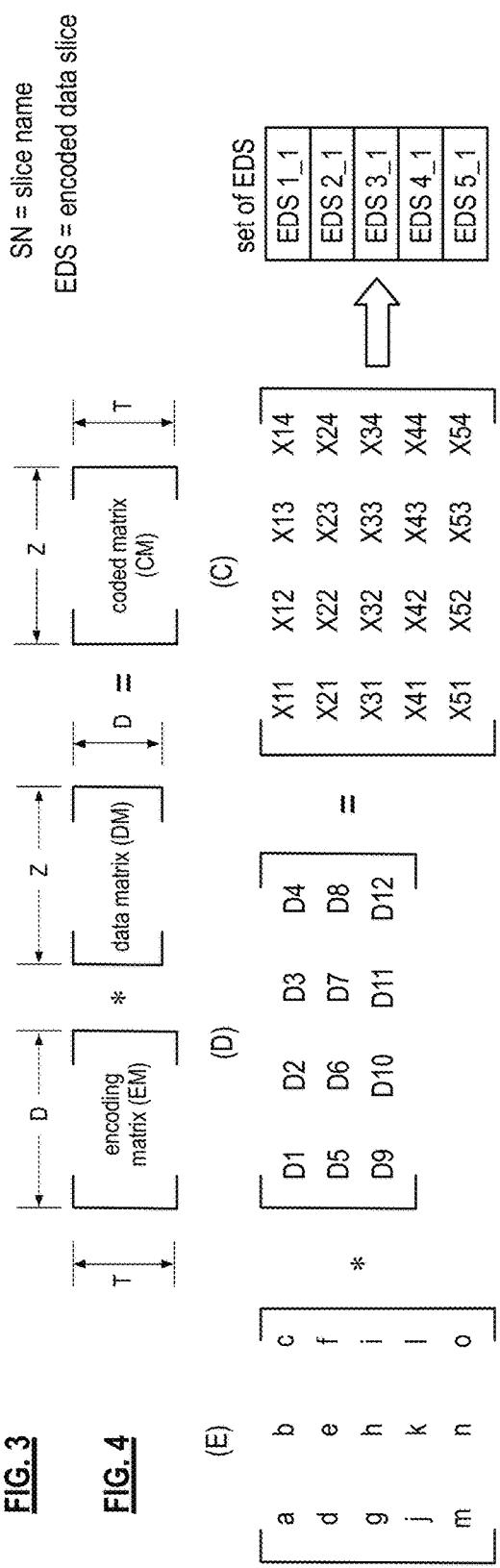

REBUILDING STRATEGY IN MEMORY MANAGED MULTI-SITE DUPLICATION

CROSS-REFERENCE TO RELATED APPLICATIONS

The present U.S. Utility Patent Application claims priority pursuant to 35 U. S.C. § 120 as a continuation-in-part of U.S. Utility application Ser. No. 15/642,875, entitled "PRIORITIZED DATA REBUILDING IN A DISPERSED STORAGE NETWORK," filed Jul. 6, 2017, which claims priority pursuant to 35 U.S.C. § 120 as a continuation-in-part of U.S. Utility Application Ser. No. 14/869,240, entitled "COORDINATING STORAGE OF DATA IN DISPERSED STORAGE NETWORKS," filed Sep. 29, 2015, now issued as U.S. Pat. No. 9,727,275, which claims priority pursuant to 35 U.S.C. § 119(e) to U.S. Provisional Application No. 62/086,542, entitled "CONSISTENT STORAGE OF DATA IN A DISPERSED STORAGE NETWORK," filed Dec. 2, 2014, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

It is further known that rebuilding of lost and/or corrupted data can result in system expenditures.

BRIEF DESCRIPTION OF THE SEVERAL VIEWS OF THE DRAWING(S)

FIG. 1 is a schematic block diagram of an embodiment of a dispersed or distributed storage network (DSN) in accordance with the present invention;

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
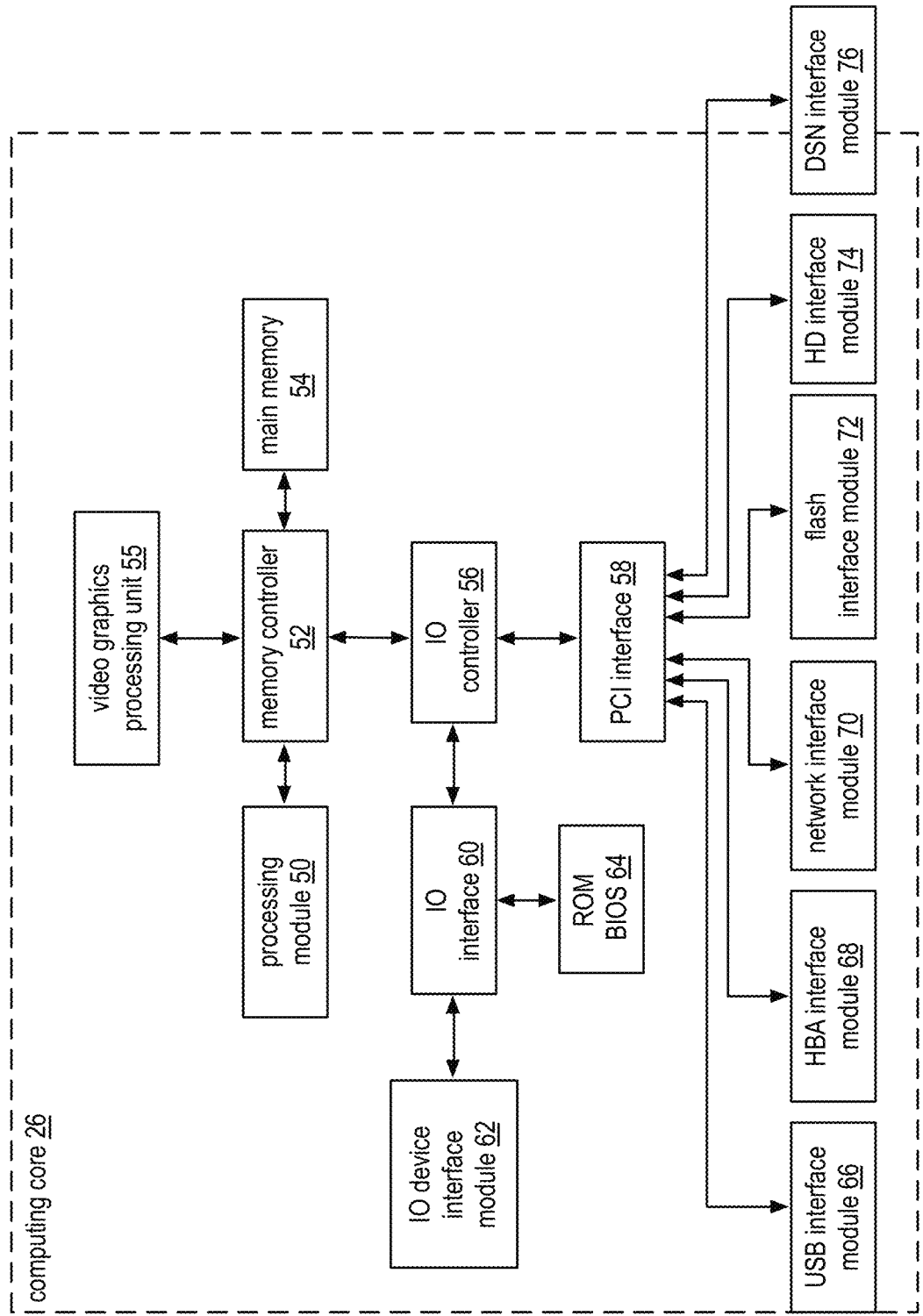
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

Figure 1A:
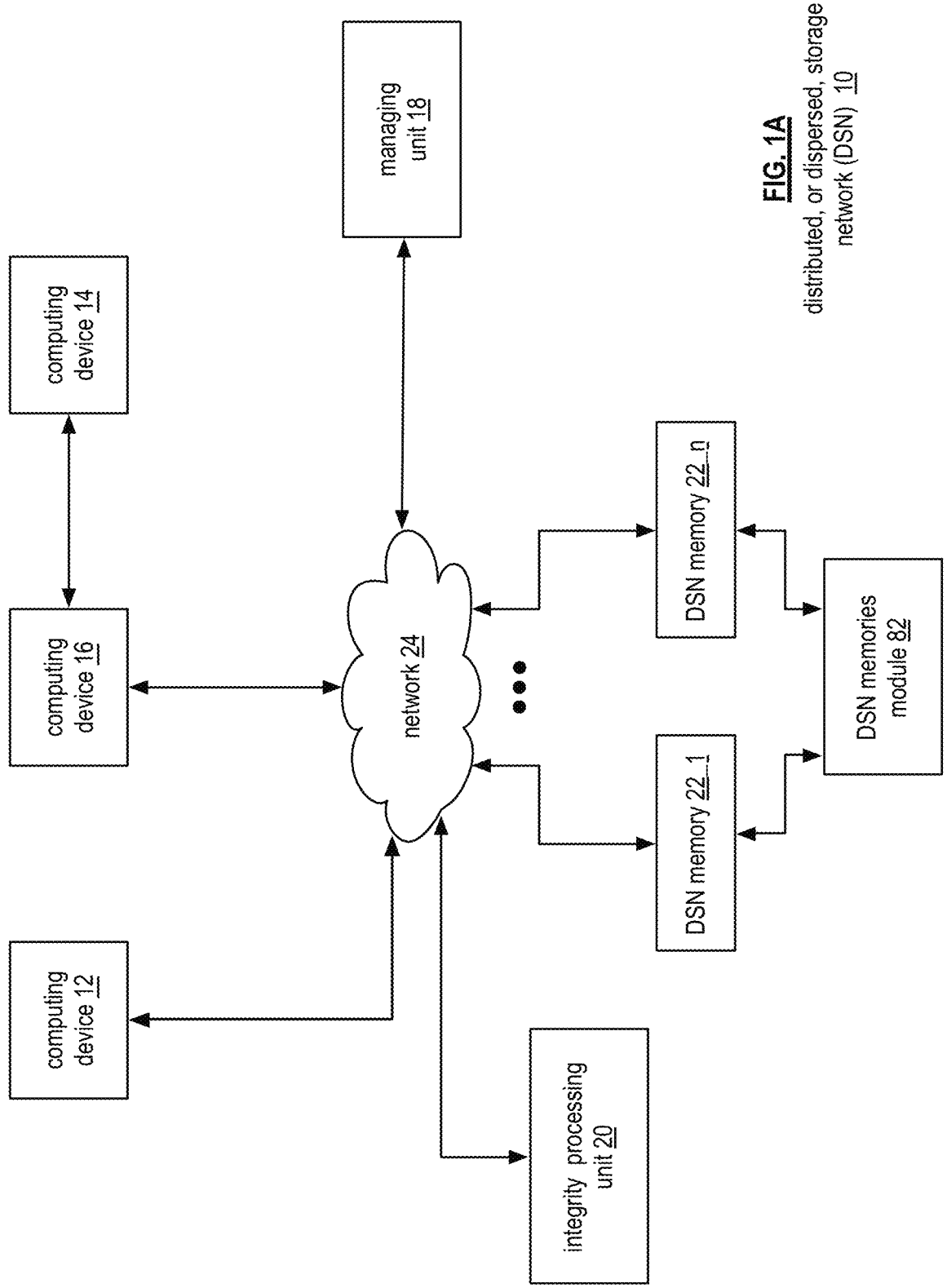
FIG. 1A is a schematic block diagram of another embodiment of a dispersed or distributed storage network (DSN) in accordance with the present invention.

FIG. 1A is a schematic block diagram of another embodiment of a dispersed or distributed storage network (DSN) 10 that includes a plurality of computing devices 12-16, a managing unit 18, an integrity processing unit 20, a plurality of DSN memories 22_1 through 22_n, and a DSN memories module 82.

DSN memories 22_1 through 22_n each include a plurality of storage units 36 where each plurality of storage units may be located at geographically different sites (e.g., one in Chicago, one in Milwaukee, etc.), at a common site, or a combination thereof. For example, if the DSN memory 22_1 and DSN 22_n each include eight storage units 36, each storage unit may be located at a different site. As another example, if the DSN memory 22_1 and DSN 22_n each include eight storage units 36, DSN memory 22_1's eight storage units are located at a first site and DSN memory 22_n's eight storage units are located at a second site.

As yet another example, if DSN memory 22_1 and DS memory 22_n each include eight storage units 36, a first pair of storage units of DSN memory 22_1 are at a first common site, a first pair of storage units of DSN memory 22_n are at a different first common site, a second pair of storage units of DSN memory 22_1 are at a second common site, a second pair of storage units of DSN memory 22_n are at a different second common site, a third pair of storage units of DSN memory 22_1 are at a third common site, a third pair of storage units of DSN memory 22_n are at a different third common site, a fourth pair of storage units of DSN memory 22_1 are at a fourth common site, and a fourth pair of storage units of DSN memory 22_n are at a different fourth common site. Note that DSN memories 22_1 through 22_n may include more or less than eight storage units 36. Further note that each storage unit 36 includes a computing core (as shown in FIG. 2, or components thereof) and a plurality of memory devices for storing dispersed error encoded data.

DSN memories module 82 may be a separate computing device and/or integrated with one or more devices of the DSN (e.g., integrated into one of more of one or more storage units 36, the managing unit 18, integrity processing unit 20, one or more of computing devices 12 or 16, etc.). When DSN memories 22_1 through 22_n each store a copy of a set of encoded data slices, DSN memories module 82 is operable to determine a rebuilding strategy that takes into account available counterpart encoded data on each DSN memory. The rebuilding strategy is discussed in greater detail with reference to FIGS. 9 and 10.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
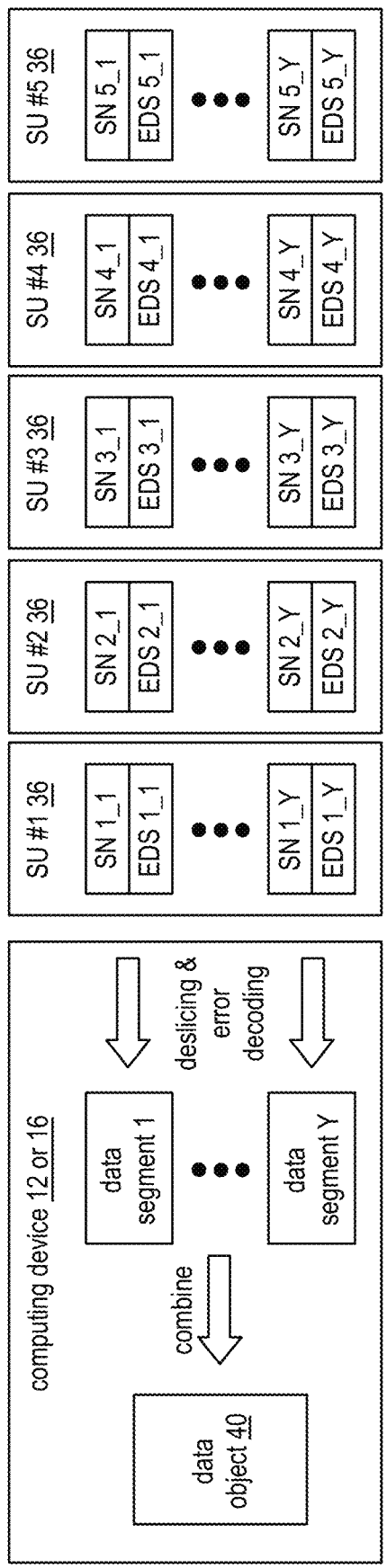
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
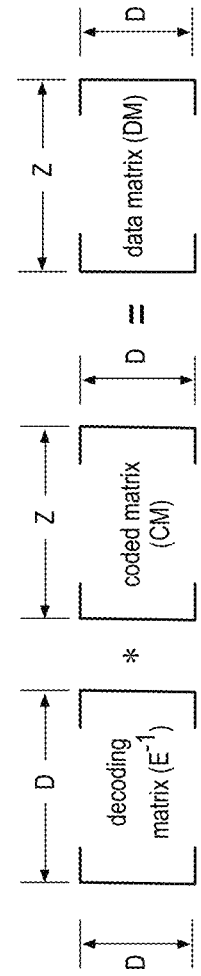
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
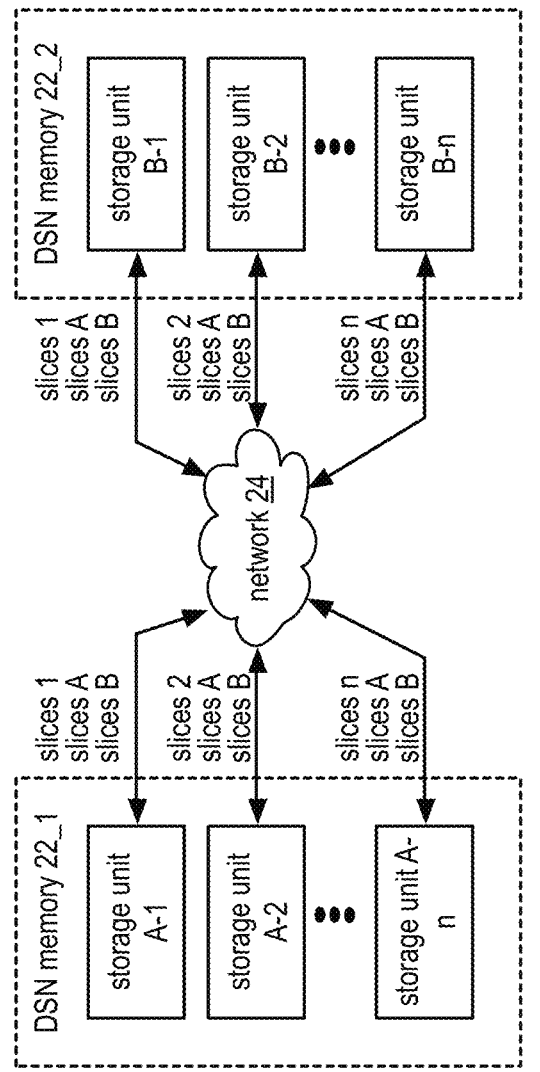
FIG. 9A is a schematic block diagram of another embodiment of a dispersed or distributed storage network (DSN) in accordance with the present invention.

FIG. 9A is a schematic block diagram of another embodiment of a dispersed or distributed storage network (DSN) that includes DSN memories 22_1 and 22_2 and the network 24 of FIG. 1. Each DSN memory includes a set of storage units, where a second set includes at least as many as a first set. For example, the DSN memory 22_1 includes storage units A-1 through A-n and DSN memory 22_2 includes storage units B-1 through B-n, where each set includes substantially the same number of storage units. Each storage unit may be implemented utilizing the storage unit 36 of FIG. 1.

The DSN functions to synchronize data stored in each DSN memory 22_1 and 22_2 such that each store identical data. Such synchronization is facilitated in part by other units accessing the stored data utilizing a common information dispersal algorithm (IDA) decode threshold level and a common IDA width. The synchronization is further facilitated by utilizing a common naming strategy to associate the data with virtual DSN addresses such that a data object stored in one DSN memory utilizing a source name and a plurality of sets of slice names is substantially the same as storage of a copy of the data object stored in the other DSN memory utilizing the source name and the plurality of sets of slice names. As such, each DSN memory stores slices of the data and slices of any sort of DSN directory and/or dispersed hierarchical index utilized to associate the data with the virtual DSN addresses. The synchronization is still further facilitated by utilizing substantially identical DSN address ranges to the two sets of storage units.

The DSN further functions to rebuild an encoded data slice associated with a storage error. In an example of operation of the rebuilding of the encoded data slice, a storage unit identifies the encoded data slice associated with storage error, where a data segment is dispersed storage error encoded to produce a set of encoded data slices that includes the encoded data slice. The identifying includes at least one of detecting a missing slice, detecting a corrupted slice, interpreting an error message, and receiving a rebuilding request.

Having identified the encoded data slice associated with the storage error, the storage unit determines whether to rebuild the identified encoded data slice. The determining may be based on interpreting a delete marker copied amongst the two or more DSN memories, where the delete marker indicates that the encoded data slice is to be deleted. For example, the storage unit indicates to rebuild the identified encoded data slice when a delete marker corresponding to the encoded data slice is not found.

When rebuilding the encoded data slice, the storage unit determines whether a copy of the encoded data slice is available from the least one of another DSN memory. For example, the storage unit A-1 issues, via the network 24, a read slice request to storage unit B-1 for the encoded data slice, interprets a read slice response, and indicates that the encoded data slices available from the other DSN memory when the read slice response includes a copy of encoded data slice. Alternatively, the storage unit A-1 indicates that the encoded data slices not available from the other DSN memory when the read slice response does not include the copy of the encoded data slice.

When the encoded data slices available from the other DSN memory, the storage unit obtains encoded data slice from the other DSN memory and stores the encoded data slice. For example, the storage unit A-1 extracts the copy of the encoded data slice from the read slice response and stores the extracted and encoded data slice in a local memory of the storage unit A-1.

When the encoded data slices are not available from the other DSN memory, the storage unit determines whether a decode threshold number of encoded data slices of the set of encoded data slices that includes encoded data slice is available from a local DSN memory associated with the storage unit. For example, the storage unit A-1 issues, via the network 24, at least a decode threshold number of read slice requests to other storage units of the DSN memory 22_1, receives read slice responses, and indicates that the encoded data slices available from the local DSN memory when the decode threshold number of encoded data slices of the set of encoded data slices is received from the received read slice responses.

When the decode threshold number of encoded data slices are available from the local DSN memory, the storage unit facilitates producing a rebuilt encoded data slice utilizing the decode threshold number of encoded data slices from the local DSN memory. For example, the storage unit a-1 dispersed storage error decodes the decode threshold number of encoded data slices to reproduce a data segment, and dispersed storage error encodes the reproduced data segment to produce the rebuilt encoded data slice.

When the decode threshold number of encoded data slices are not available from the local DSN memory, the storage unit facilitates producing the rebuilt encoded data slice utilizing a decode threshold number of encoded data slices of the set of encoded data slices and one or more other sets of encoded data slices corresponding to the set of encoded data slices, where the one or more other sets of encoded data slices are stored in one or more of the other DSN memories. For example, the storage unit A-1 issues the decode threshold number of read slice requests to storage units of the DSN memory 22_1 and storage units of the DSN memory 22_2, receives the decode threshold number of encoded data slices, dispersed storage error decodes the received decode threshold number of encoded data slices to reproduce the data segment, and dispersed storage error encodes the reproduced data segment to produce the rebuilt encoded data slice. As such, the storage unit may be able to rebuild encoded data slice even when each DSN memory stores less than the decode threshold number of encoded data slices but together provides the decode threshold number of encoded data slices.

Figure 9B:
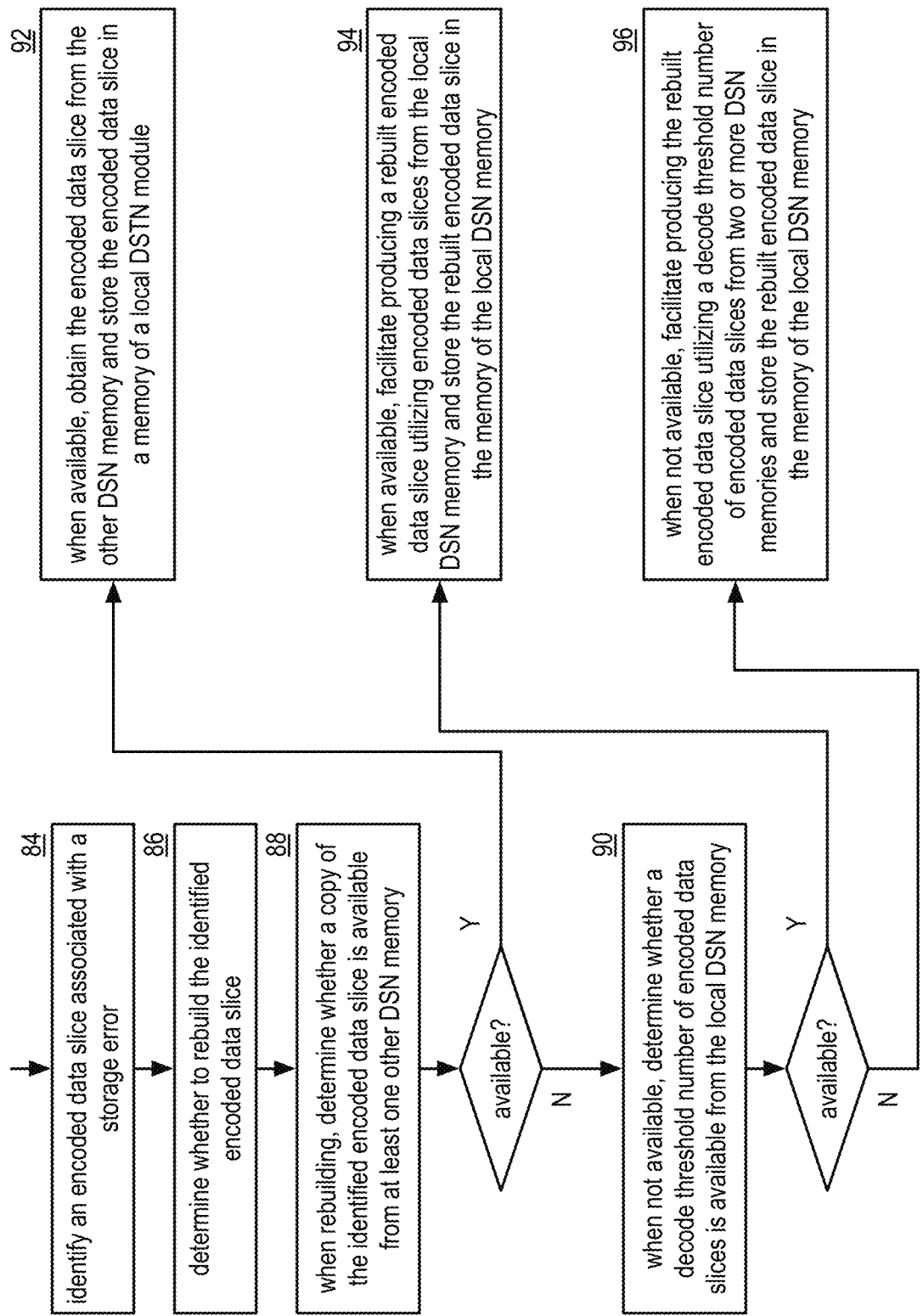
FIG. 9B is a flowchart illustrating an example of rebuilding data in accordance with the present invention.

FIG. 9B is a flowchart illustrating an example of rebuilding data in accordance with the present invention. The method begins with step 84 where a processing module (e.g., of a storage unit) identifies an encoded data slice associated with a storage error. The identifying includes at least one of detecting a corrupted slice, identifying a missing slice, interpreting an error message, and receiving a rebuilding request. The method continues with step 86 where the processing module determines whether to rebuild the identified encoded data slice. The determining includes indicating to rebuild when the encoded data slice is to be maintained (e.g., a delete marker for the encoded data slice is not detected).

When rebuilding, the method continues with step 88 where the processing module determines whether a copy of the identified encoded data slice is available from the least one other DSN memory. For example, the processing module issues read slice requests to one or more DSN memories, interprets one or more received read slice responses and indicates that the copy of the encoded data slice is not available when none of responses includes a copy of the identified encoded data slice.

When the copy of the identified encoded data slice is not available from the at least one other DSN memory, the method continues to step 90 where the processing module determines whether a decode threshold number of encoded data slices is available from the local DSN memory. For example, the processing module issues at least a decode threshold number of read slice requests to storage units of the local DSN memory and interprets received read slice responses. When the decode threshold number of encoded data slices are not available from the local DSN memory, the method continues to step 96 where the processing module facilitates producing the rebuilt encoded data slice utilizing a decode threshold number of encoded data slices from two or more DSN memory and stores the rebuilt encoded data slice of a memory of the local DSN memory.

For example, the processing module issues read slice requests to the two or more DSN memories, dispersed storage error decodes the decode threshold number of encoded data slices to reproduce the data segment, dispersed storage error encodes the reproduced data segment to produce the rebuilt encoded data slice, and stores the rebuilt encoded data slice and a corresponding storage unit of the local DSN memory. When the decode threshold number of encoded data slices are available from the local DSN memory, the method continues with step 94 where the processing module facilitates producing a rebuilt encoded data slice utilizing encoded data slices from the local DSN memory and stores the rebuilt encoded data slice in the memory of the local DSN memory.

When the copy of the identified encoded data slice is available from the at least one other DSN memory, the method continues with step 92 where the processing module obtains the encoded data slice from the other DSN memory and stores the encoded data slice in a memory of a local DSN memory.

Figure 10:
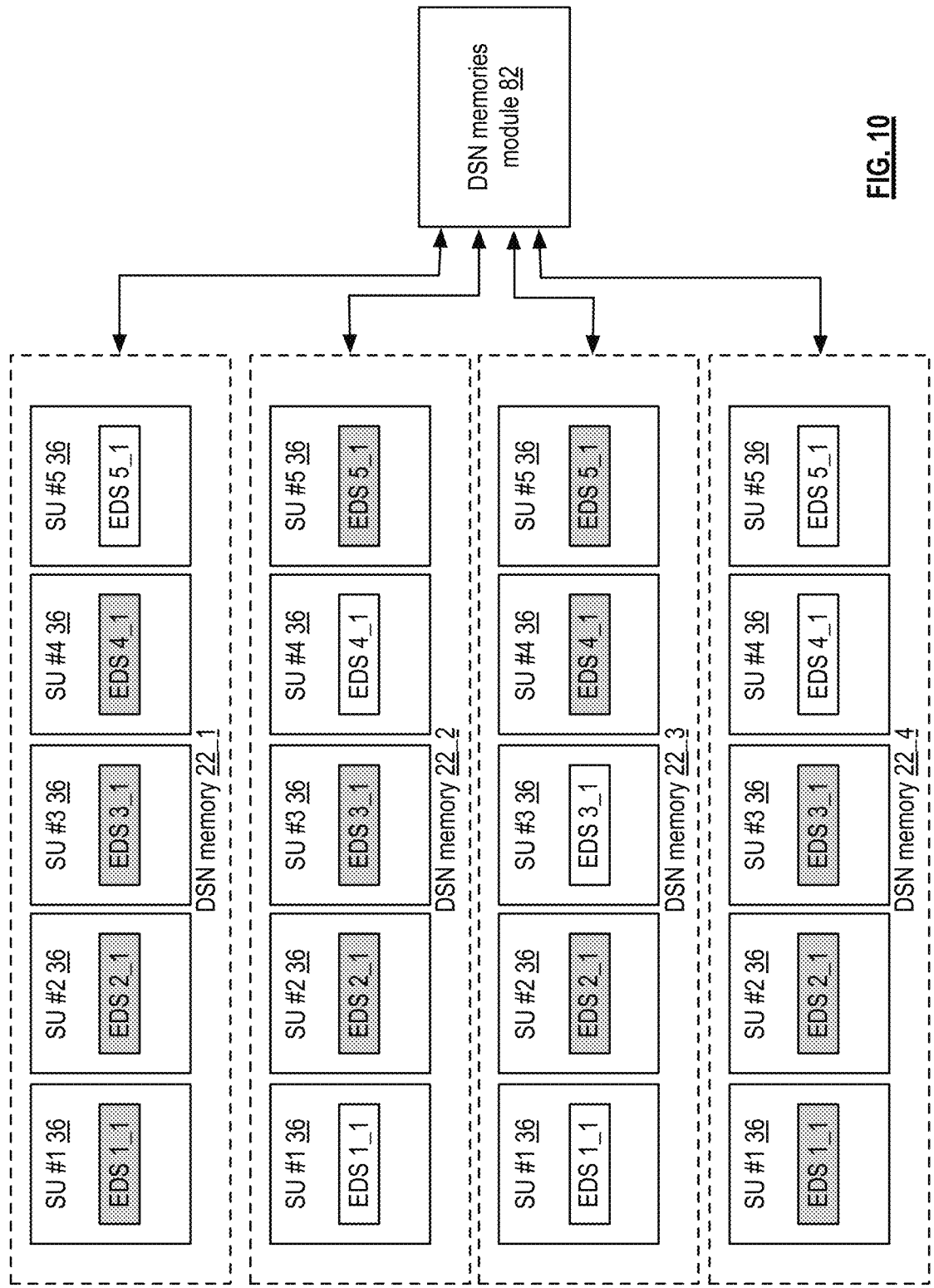
FIG. 10 is a schematic block diagram of another embodiment of a dispersed or distributed storage network (DSN) in accordance with the present invention.

FIG. 10 is a schematic block diagram of another embodiment of a dispersed or distributed storage network (DSN) that includes DSN memories 22_1 through 22_4 and DSN memories module 82. DSN memories 22_1 through 22_4 each include a set of storage units (SUs 1-5) and store copies of a set of encoded data slices (EDSs 1_1 through 5_1).

DSN memories module 82 may be a separate computing device and/or integrated with one or more devices of the DSN (e.g., integrated into one of more of one or more storage units 36, the managing unit 18, integrity processing unit 20, one or more of computing devices 12 or 16, etc.). DSN memories module 82 is operable to determine a rebuilding strategy that takes into account available counterpart encoded data slices on DSN memories 22_1 through 22_4.

In an example of operation, DSN memories module 82 identifies encoded data slices in need of rebuilding. For example, DSN memories module 82 identifies EDSs 1_1 through 4_1 of DSN memory 22_1, EDS 2_1, 3_1, and 5_1 of DSN memory 22_2, EDS 2_1, 4_1, and 5_1 of DSN memory 22_3, and EDS 1_1 through 3_1 of DSN memory 22_4 as encoded data slices in need of rebuilding. DSN memories module 82 determines a rebuilding strategy for the encoded data slices in need of rebuilding based on at least one of an urgency rebuild factor and a rebuild complexity factor.

The urgency rebuild factor is a level of urgency of the rebuild (e.g., how close to decode threshold number of encoded data slices are left in a set and whether the rebuild can wait). When the urgency rebuild factor is low, the DSN memories module 82 queues rebuilding of encoded data slices for a later in time rebuilding. When the urgency rebuild factor is high, the DSN memories module 82 implements rebuilding encoded data slices in a proximal timeframe.

The DSN memories module 82 determines the urgency rebuild factor by determining an individual urgency rebuild factor for each copy of the set of encoded data slices to produce a plurality of individual urgency rebuild factors. The DSN memories module 82 determines the urgency rebuild factor based on the plurality of individual urgency rebuild factors. For example, if the decode threshold number (e.g., the number of encoded data slices required to reconstruct a data segment) is 3, the DSN memories module 82 determines that each DSN memory has a high urgency rebuild factor because each DSN memory needs at least 3 encoded data slices rebuilt. DSN memory 22_1 has the highest urgency rebuild factor because it contains 4 encoded data slices in need of rebuilding.

The DSN memories module 82 determines the rebuild complexity factor by determining for an encoded data slice of the encoded data slices in need of rebuilding whether the encoded data slice exists in another copy of the set of encoded data slices (e.g., whether the encoded data slice has a counterpart available in another DSN memory that does not require rebuilding). When the encoded data slice in need of rebuilding exists in another copy of the set of encoded data slices, the DSN memories module 82 sets the rebuild complexity factor at a first threshold (e.g., at a low complexity because the DSN memories module 82 can "copy and paste" the encoded data slice from another DSN memory as the rebuilt encoded data slice). When the encoded data slice in need of rebuilding does not exist in another copy of the set of encoded data slices, the DSN memories module 82 sets the rebuild complexity factor at a second threshold, where the second threshold is higher than the first threshold (e.g., because the encoded data slice will need to be rebuilt using a decode threshold number of encoded data slices).

As an example, DSN memories module 82 determines a rebuilding strategy for EDS 1_1 of DSN memory 22_1. The rebuilding strategy is based on a high urgency rebuild factor (i.e., the rebuild cannot wait because DSN memory 22_1 contains 4 encoded data slices in need of rebuilding) and a low rebuild complexity factor (e.g., EDS 1_1 exists in DSN memory 22_2 and 22_3). DSN memories module 82 obtains a copy of EDS 1_1 from DSN memory 22_2 or 22_3 and produces a rebuilt EDS 1_1 from the copy of EDS 1_1 (e.g., via a "copy and paste" function). DSN memories module 82 sends the rebuilt EDS 1_1 to storage unit (SU) 1 of DSN memory 22_1.

As another example, DSN memories module 82 determines a rebuilding strategy for EDS 2_1. The rebuilding strategy is based on a high urgency rebuild factor (i.e., all DSN memories require at least a decode threshold number of encoded data slice rebuilds) and a high rebuild complexity factor (e.g., EDS 2_1 does not exist (e.g., is corrupted and/or missing) in any DSN memory). Even though the urgency rebuild factor is currently high, the DSN memories module 82 may queue the rebuilding of EDS 2_1 until more encoded data slices are rebuilt that have low rebuild complexity factors.

To rebuild EDS 2_1, the DSN memories module 82 retrieves a decode threshold number of encoded data slices of the set of encoded data slices from the DSN memories. For example, the DSN memories module 82 distributes the retrieval of the decode threshold number of encoded data slices among the sets of storage units of DSN memories 22_1 through 22_4 to reduce the overall burden. For example, the DSN memories module 82 may retrieve EDS 5_1 from DSN 22_1, EDS 1_1 from DSN 22_2, and EDS 3_1 from DSN memory 22_3. The DSN memories module 82 reconstructs a data segment from the decode threshold number of encoded data slices and dispersed storage error encodes the data segment to produce a new set of encoded data slices. The DSN memories module 82 selects an encoded data slice from the new set of encoded data slices as the rebuilt EDS 2_1 and sends rebuilt EDS 2_1 to storage units (SUs) 2 of DSN memories 22_1 through 22_4.

Figure 11:
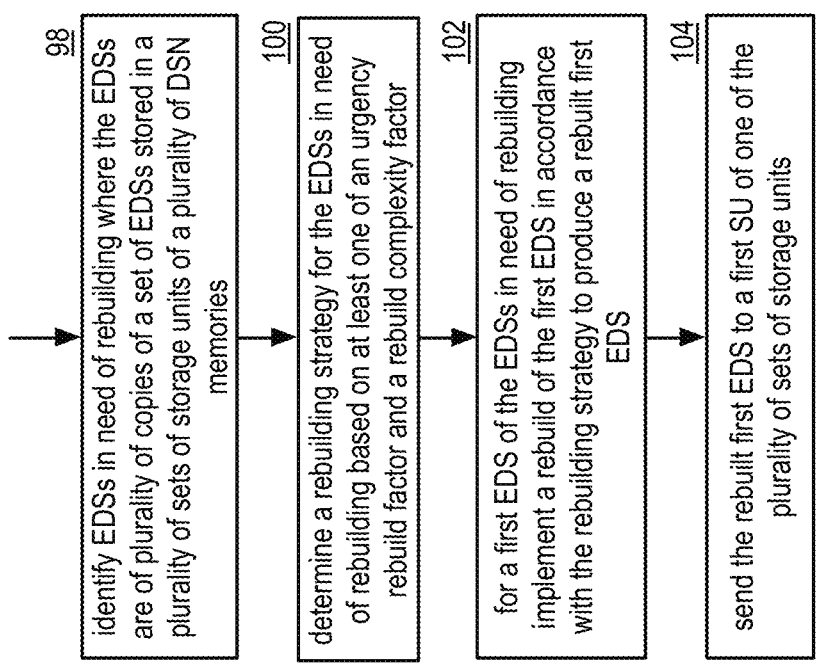
FIG. 11 is a logic diagram of an example of a method of a rebuilding strategy in memory managed multi-site duplication in accordance with the present invention.

FIG. 11 is a logic diagram of an example of a method of a rebuilding strategy in memory managed multi-site duplication. The method begins with step 98 where a dispersed storage network (DSN) memories module operating on one or more devices of the DSN identifies encoded data slices in need of rebuilding. The encoded data slices are of plurality of copies of a set of encoded data slices, where the plurality of copies of the set of encoded data slices is stored in a plurality of sets of storage units of a plurality of DSN memories. A first set of storage units of the plurality of sets of storage units is affiliated with a first DSN memory of the plurality of DSN memories The method continues with step 100 where the DSN memories module determines a rebuilding strategy for the encoded data slices in need of rebuilding based on at least one of an urgency rebuild factor and a rebuild complexity factor. The urgency rebuild factor is a level of urgency of the rebuild (e.g., how close to decode threshold number of encoded data slices are left in a set and whether the rebuild can wait). The DSN memories module determines the urgency rebuild factor by determining for each copy of the plurality of copies of the set of encoded data slices to produce a plurality of individual urgency rebuild factors. The DSN memories module determines the urgency rebuild factor based on the plurality of individual urgency rebuild factors. When the urgency rebuild factor is low, the DSN memories module queues rebuilding of encoded data slices for a later in time rebuilding. When the urgency rebuild factor is high, the DSN memories module implements rebuilding encoded data slices in a proximal timeframe.

The DSN memories module determines the rebuild complexity factor by determining for an encoded data slice of the encoded data slices in need of rebuilding in a copy of the plurality of copies of the set of encoded data slices whether the encoded data slice exists in another copy of the set of encoded data slices (e.g., whether the encoded data slice has a counterpart available in another DSN memory that does not require rebuilding). When the encoded data slice in need of rebuilding exists in another copy of the plurality of copies of the set of encoded data slices, the DSN memories module sets the rebuild complexity factor at a first threshold (e.g., at a low complexity because the DSN memories module can "copy and paste" the encoded data slice from another DSN memory as the rebuilt encoded data slice).

When the encoded data slice in need of rebuilding does not exist in another copy of the plurality of copies of the set of encoded data slices, the DSN memories module sets the rebuild complexity factor at a second threshold, where the second threshold is higher than the first threshold (e.g., because the encoded data slice will need to be rebuilt using a decode threshold number of encoded data slices).

The method continues with step 102 where for a first encoded data slice of the encoded data slices in need of rebuilding, the DSN memories module implements a rebuild of the first encoded data slice in accordance with the rebuilding strategy to produce a rebuilt first encoded data slice. For example, the rebuild strategy for the first encoded data slice may include the DSN memories module obtaining a copy of the first encoded data slice from a copy of the plurality of copies of the set of encoded data slices and producing the rebuilt first encoded data slice from the copy of the first encoded data slice (e.g., when the rebuild complexity factor is low).

As another example, the rebuild strategy for the first encoded data slice may include the DSN memories module retrieving a threshold number of encoded data slices of the set of encoded data slices (e.g., when the rebuild complexity factor is high). For example, the DSN memories module distributes the retrieval of the threshold number of encoded data slices among the sets of storage units in accordance with the rebuild strategy to reduce overall burden. The DSN memories module reconstructs a data segment from the threshold number of encoded data slices, dispersed storage error encodes the data segment to produce a new set of encoded data slices, and selects an encoded data slice from the new set of encoded data slices as the rebuilt first encoded data slice.

The method continues with step 104 where the DSN memories module sends the rebuilt first encoded data slice to a first storage unit of one of the plurality of sets of storage units. For a second encoded data slice of the encoded data slices in need of rebuilding, the DSN memories module implements a rebuild of the second encoded data slice to produce a rebuilt second encoded data slice and sends the rebuilt second encoded data slice to a second storage unit of one of the plurality of sets of storage units. For a second encoded data slice of the encoded data slices in need of rebuilding, where the second encoded data slice shares a pillar number with the first encoded data slice, the DSN memories module obtains a copy of the rebuilt first encoded data slice. The DSN memories module produces a rebuilt second encoded data slice from the copy of the rebuilt first encoded data slice and sends the rebuilt second encoded data slice to a second storage unit of one of the plurality of sets of storage units.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    identifying, by a dispersed storage network (DSN) memories module operating on one or more devices of the DSN, encoded data slices in need of rebuilding, wherein the encoded data slices are of a plurality of copies of a set of encoded data slices, wherein the plurality of copies of the set of encoded data slices is stored in a plurality of sets of storage units of a plurality of DSN memories, wherein a first set of storage units of the plurality of sets of storage units is affiliated with a first DSN memory of the plurality of DSN memories;
    determining, by the DSN memories module, a rebuilding strategy for the encoded data slices in need of rebuilding based on at least one of an urgency rebuild factor and a rebuild complexity factor; and
    for a first encoded data slice of the encoded data slices in need of rebuilding:
        implementing, by the DSN memories module and in accordance with the rebuilding strategy, a rebuild of the first encoded data slice to produce a rebuilt first encoded data slice; and
        sending, by the DSN memories module, the rebuilt first encoded data slice to a first storage unit of one of the plurality of sets of storage units.

2. The method of claim 1, the determining the rebuilding strategy comprises:
    determining the urgency rebuild factor by:
        determining, by the DSN memories module, an individual urgency rebuild factor for each copy of the plurality of copies of the set of encoded data slices to produce a plurality of individual urgency rebuild factors; and
        determining, by the DSN memories module, the urgency rebuild factor based on the plurality of individual urgency rebuild factors.

3. The method of claim 1, the determining the rebuilding strategy comprises:
    determining the rebuild complexity factor by:
        determining, by the DSN memories module, for an encoded data slice of the encoded data slices in need of rebuilding in a copy of the plurality of copies of the set of encoded data slices whether the encoded data slice exists in another copy of the plurality of copies of the set of encoded data slices;
        when the encoded data slice exists in the other copy of the plurality of copies of the set of encoded data slices, setting, by the DSN memories module, the rebuild complexity factor at a first threshold; and
        when the encoded data slice does not exist in the other copy of the plurality of copies of the set of encoded data slices, setting, by the DSN memories module, the rebuild complexity factor at a second threshold, wherein the second threshold is higher than the first threshold.

4. The method of claim 1, wherein the rebuild strategy for the first encoded data slice comprises:
    obtaining, by the DSN memories module, a copy of the first encoded data slice from a copy of the plurality of copies of the set of encoded data slices; and
    producing, by the DSN memories module, the rebuilt first encoded data slice from the copy of the first encoded data slice.

5. The method of claim 1, wherein the rebuild strategy for the first encoded data slice comprises:
    retrieving, by the DSN memories module, a threshold number of encoded data slices of the set of encoded data slices;
    reconstructing, by the DSN memories module, a data segment from the threshold number of encoded data slices;
    dispersed storage error encoding, by the DSN memories module, the data segment to produce a new set of encoded data slices; and
    selecting, by the DSN memories modules, an encoded data slice from the new set of encoded data slices as the rebuilt first encoded data slice.

6. The method of claim 5 further comprises:
distributing, by the DSN memories module, the retrieval of the threshold number of encoded data slices among the sets of storage units in accordance with the rebuild strategy.

7. The method of claim 5 further comprises:
for a second encoded data slice of the encoded data slices in need of rebuilding, wherein the second encoded data slice shares a pillar number with the first encoded data slice:
obtaining, by the DSN memories module, a copy of the rebuilt first encoded data slice;
producing, by the DSN memories module, a rebuilt second encoded data slice from the copy of the rebuilt first encoded data slice; and
sending, by the DSN memories module, the rebuilt second encoded data slice to a second storage unit of one of the plurality of sets of storage units.

8. The method of claim 1 further comprises:
when urgency rebuild factor is low, queuing, by the DSN memories module, rebuilding for the first encoded data slice for a later in time rebuilding; and
when the urgency rebuild factor is high, implementing, by the DSN memories module, rebuilding the first encoded data slice in a proximal timeframe.

9. The method of claim 1 further comprises:
for a second encoded data slice of the encoded data slices in need of rebuilding:
implementing, by the DSN memories module and in accordance with the rebuilding strategy, a rebuild of the second encoded data slice to produce a rebuilt second encoded data slice; and
sending, by the DSN memories module, the rebuilt second encoded data slice to a second storage unit of one of the plurality of sets of storage units.

10. A dispersed storage network (DSN) memories module operating on one or more devices of the DSN, the DSN memories module comprises:
an interface;
memory; and
a processing module operably coupled to the memory and the interface, wherein the processing module is operable to:
identify encoded data slices in need of rebuilding, wherein the encoded data slices are of a plurality of copies of a set of encoded data slices, wherein the plurality of copies of the set of encoded data slices is stored in a plurality of sets of storage units of a plurality of DSN memories, wherein a first set of storage units of the plurality of sets of storage units is affiliated with a first DSN memory of the plurality of DSN memories;
determine a rebuilding strategy for the encoded data slices in need of rebuilding based on at least one of an urgency rebuild factor and a rebuild complexity factor; and
for a first encoded data slice of the encoded data slices in need of rebuilding:
implementing in accordance with the rebuilding strategy, a rebuild of the first encoded data slice to produce a rebuilt first encoded data slice; and
send the rebuilt first encoded data slice to a first storage unit of one of the plurality of sets of storage units.

11. The DSN memories module of claim 10, wherein the processing module is operable to determine the rebuilding strategy by:

determining the urgency rebuild factor by:
determining an individual urgency rebuild factor for each copy of the plurality of copies of the set of encoded data slices to produce a plurality of individual urgency rebuild factors; and
determining the urgency rebuild factor based on the plurality of individual urgency rebuild factors.

12. The DSN memories module of claim 10, wherein the processing module is operable to determine the rebuilding strategy by:
determining the rebuild complexity factor by:
determining for an encoded data slice of the encoded data slices in need of rebuilding in a copy of the plurality of copies of the set of encoded data slices whether the encoded data slice exists in another copy of the plurality of copies of the set of encoded data slices;
when the encoded data slice exists in the other copy of the plurality of copies of the set of encoded data slices, setting the rebuild complexity factor at a first threshold; and
when the encoded data slice does not exist in the other copy of the plurality of copies of the set of encoded data slices, setting the rebuild complexity factor at a second threshold, wherein the second threshold is higher than the first threshold.

13. The DSN memories module of claim 10, wherein the rebuild strategy for the first encoded data slice comprises:
obtaining a copy of the first encoded data slice from a copy of the plurality of copies of the set of encoded data slices; and
producing the rebuilt first encoded data slice from the copy of the first encoded data slice.

14. The DSN memories module of claim 10, wherein the rebuild strategy for the first encoded data slice comprises:
retrieving a threshold number of encoded data slices of the set of encoded data slices;
reconstructing a data segment from the threshold number of encoded data slices;
dispersed storage error encoding the data segment to produce a new set of encoded data slices; and
selecting an encoded data slice from the new set of encoded data slices as the rebuilt first encoded data slice.

15. The DSN memories module of claim 14, wherein the processing module is further operable to:
distribute the retrieval of the threshold number of encoded data slices among the sets of storage units in accordance with the rebuild strategy.

16. The DSN memories module of claim 14, wherein the processing module is further operable to:
for a second encoded data slice of the encoded data slices in need of rebuilding, wherein the second encoded data slice shares a pillar number with the first encoded data slice:
obtain a copy of the rebuilt first encoded data slice;
produce a rebuilt second encoded data slice from the copy of the rebuilt first encoded data slice; and
send the rebuilt second encoded data slice to a second storage unit of one of the plurality of sets of storage units.

17. The DSN memories module of claim 10, wherein the processing module is further operable to:
when urgency rebuild factor is low, queue rebuilding for the first encoded data slice for a later in time rebuilding; and when the urgency rebuild factor is high, implement rebuilding the first encoded data slice in a proximal timeframe.

18. The DSN memories module of claim 10, wherein the processing module is further operable to:
for a second encoded data slice of the encoded data slices in need of rebuilding:
implement in accordance with the rebuilding strategy, a rebuild of the second encoded data slice to produce a rebuilt second encoded data slice; and
send the rebuilt second encoded data slice to a second storage unit of one of the plurality of sets of storage units.

* * * * *